(12) United States Patent
Yoo et al.

(10) Patent No.: US 12,406,809 B2
(45) Date of Patent: Sep. 2, 2025

(54) MULTILAYER ELECTRONIC COMPONENT

(71) Applicant: SAMSUNG ELECTRO-MECHANICS CO., LTD., Suwon-si (KR)

(72) Inventors: Dong Geon Yoo, Suwon-si (KR); Su Been Kim, Suwon-si (KR); Dong Jun Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 178 days.

(21) Appl. No.: 18/135,328

(22) Filed: Apr. 17, 2023

(65) Prior Publication Data

US 2023/0360855 A1 Nov. 9, 2023

(30) Foreign Application Priority Data

May 9, 2022 (KR) ........................ 10-2022-0056542

(51) Int. Cl.
| | |
|---|---|
| *H01G 4/30* | (2006.01) |
| *C04B 35/468* | (2006.01) |
| *C04B 35/64* | (2006.01) |
| *H01G 4/008* | (2006.01) |
| *H01G 4/012* | (2006.01) |
| *H01G 4/12* | (2006.01) |

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
CPC .... C04B 35/4682; C04B 35/64; H01G 4/008; H01G 4/012; H01G 4/1227; H01G 4/30
See application file for complete search history.

(56) References Cited

U.S. PATENT DOCUMENTS

| | | | |
|---|---|---|---|
| 2001/0021095 A1* | 9/2001 | Mizuno | C01G 23/006 361/321.5 |
| 2018/0130601 A1 | 5/2018 | Kim et al. | |
| 2019/0066920 A1* | 2/2019 | Kim | C04B 35/4682 |
| 2021/0159013 A1* | 5/2021 | Chun | H01G 4/012 |
| 2021/0210288 A1* | 7/2021 | Kang | C04B 35/49 |

(Continued)

FOREIGN PATENT DOCUMENTS

| | | |
|---|---|---|
| KR | 10-2018-0051760 A | 5/2018 |
| KR | 10-2021-0100952 A | 8/2021 |

*Primary Examiner* — Nathan Milakovich
(74) *Attorney, Agent, or Firm* — MORGAN, LEWIS & BOCKIUS LLP

(57) ABSTRACT

A multilayer electronic component including a dielectric layer is provided. The dielectric layer includes a plurality of dielectric grains, and at least one of the plurality of dielectric grains has a core-interface shell-shell structure. The dielectric grain having the core-interface shell-shell structure includes a perovskite ($BaTiO_3$)-based base main component, a first subcomponent including silicon (Si), and a second subcomponent including at least one selected from the group consisting of manganese (Mn), vanadium (V), chromium (Cr), iron (Fe), nickel (Ni), cobalt (Co), copper (Cu), zinc (Zn), and tin (Sn). An average content of the first subcomponent is highest in the first interface shell region, and an average content of the second subcomponent is highest in the second interface shell region.

13 Claims, 10 Drawing Sheets

(56) References Cited

U.S. PATENT DOCUMENTS

| | | | |
|---|---|---|---|
| 2021/0249192 A1* | 8/2021 | Kang | H01G 4/30 |
| 2022/0199326 A1* | 6/2022 | Kim | C04B 35/62821 |
| 2024/0170213 A1* | 5/2024 | Lee | B32B 18/00 |
| 2024/0339264 A1* | 10/2024 | Kim | H01G 4/1227 |

* cited by examiner

MULTILAYER ELECTRONIC COMPONENT

CROSS-REFERENCE TO RELATED APPLICATION(S)

This application claims benefit of priority to Korean Patent Application No. 10-2022-0056542 filed on May 9, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a type of multilayer electronic component, is a chip-type condenser mounted on the printed circuit boards of various types of electronic products such as an image display device, for example, a liquid crystal display (LCD), a plasma display panel (PDP) or the like, a computer, a smartphone, and a mobile phone to serve to charge or discharge electricity therein or therefrom.

As the scope of application of capacitors has gradually become wider, demand for miniaturization, high capacitance, and high reliability is gradually expanding. Sizes of multilayer ceramic capacitors have been decreased to achieve miniaturization and high capacitance. Since the number of laminated layers should be increased to achieve high capacitance while decreasing a size of a multilayer ceramic capacitor, thinning of dielectric materials and internal electrodes may necessarily be accompanied.

However, as thicknesses of the dielectric material and the internal electrodes are decreased, deterioration of the internal electrode may occur under an electric field, resulting in deteriorated reliability. There have been attempts to achieve improve reliability of a multilayer electronic component by adding additive elements to a dielectric composition. However, when a dielectric composition having a size of a predetermined level or less is prepared, it has so far been difficult to develop and achieve a target high reliability level and to develop new models due to low sintering stability.

Accordingly, high-temperature shortening sintering maintaining process time to be short at a high temperature during a sintering process has been applied to prevent deterioration of internal electrodes. However, when dielectric powder particles having a small size may be subjected to high-temperature shortening sintering, time of additive diffusion into a lattice of a dielectric composition is insufficient. Therefore, deterioration of reliability may remain an issue.

SUMMARY

An aspect of the present disclosure is to provide a multilayer electronic component in which an additive is doped in or added to dielectric particles to improve reliability thereof.

An aspect of the present disclosure is to provide a multilayer electronic component in which an interface shell region is formed in a dielectric grain to facilitate diffusion of an additive and to decrease a sintering temperature during high-temperature shortening sintering to improve reliability for insulating deterioration.

An aspect of the present disclosure is to provide a multilayer electronic component in which a region, having a tetragonal structure, of a dielectric grain, is increased to improve dielectric characteristics.

However, the present disclosure is not limited thereto, and may be more easily understood in a process of describing exemplary embodiments in the present disclosure.

According to an aspect of the present disclosure, a multilayer electronic component includes: a body including dielectric layers and internal electrodes; and external electrodes disposed on end surfaces of the body and connected to the internal electrodes. At least one of the dielectric layers includes a plurality of dielectric grains, and at least one of the plurality of dielectric grains has a core-interface shell-shell structure including a core region on an internal side of the dielectric grain, an interface shell region including first and second interface shell regions covering at least a portion of the core region, and a shell region covering at least a portion of the interface shell region. The dielectric grain having the core-interface shell-shell structure includes a perovskite (BaTi (3)-based base main component, a first subcomponent including silicon (Si), and a second subcomponent including at least one selected from the group consisting of manganese (Mn), vanadium (V), chromium (Cr), iron (Fe), nickel (Ni), cobalt (Co), copper (Cu), zinc (Zn), and tin (Sn). An average content of the first subcomponent is highest in the first interface shell region, and an average content of the second subcomponent is highest in the second interface shell region.

According to another aspect of the present disclosure, a multilayer electronic component includes: a body including dielectric layers and internal electrodes; and external electrodes disposed on end surfaces of the body and connected to the internal electrodes. At least one of the dielectric layers includes a plurality of dielectric grains, and at least one of the plurality of dielectric grains has a core-interface shell-shell structure including a core region on an internal side of the dielectric grain, an interface shell region covering at least a portion of the core region, and a shell region covering at least a portion of the interface shell region. The dielectric grain having the core-interface shell-shell structure includes a perovskite ($BaTiO_3$)-based base main component, a first subcomponent including silicon (Si), and a second subcomponent including tin (Sn). In the dielectric grain having core-interface shell-shell structure, an average content of the first subcomponent is highest in the interface shell, and an average content of the second subcomponent is highest in the interface shell.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
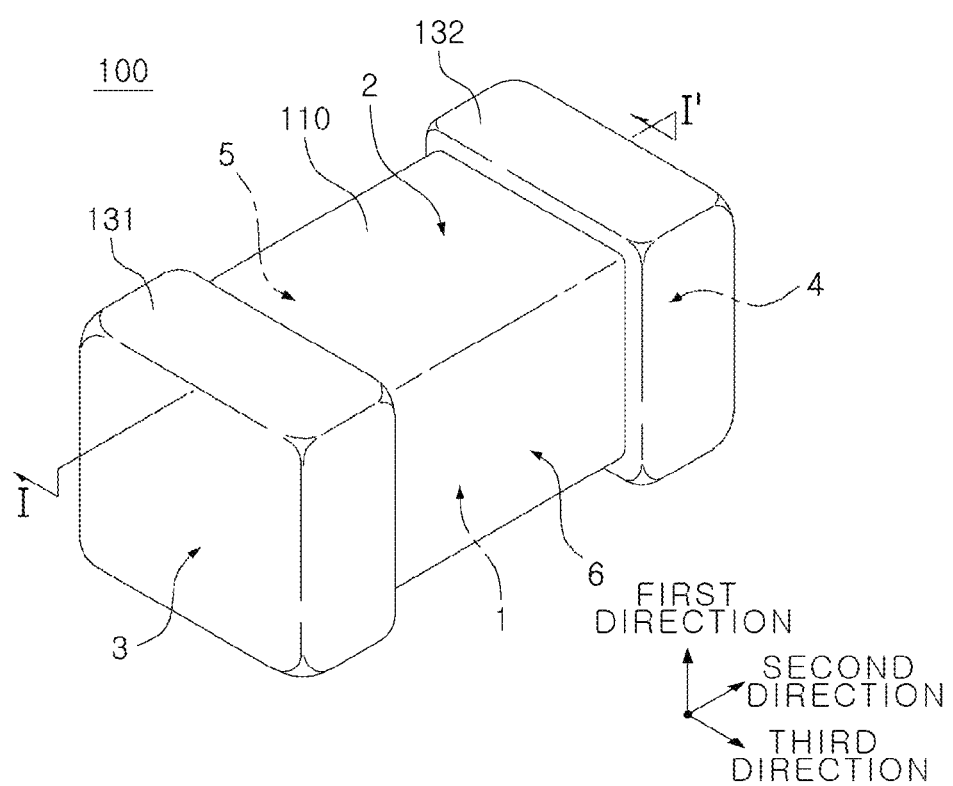
FIG. 1 is a schematic perspective view illustrating a multilayer electronic component according to an exemplary embodiment in the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view illustrating a multilayer electronic component according to an exemplary embodiment in the present disclosure.

Figure 2:
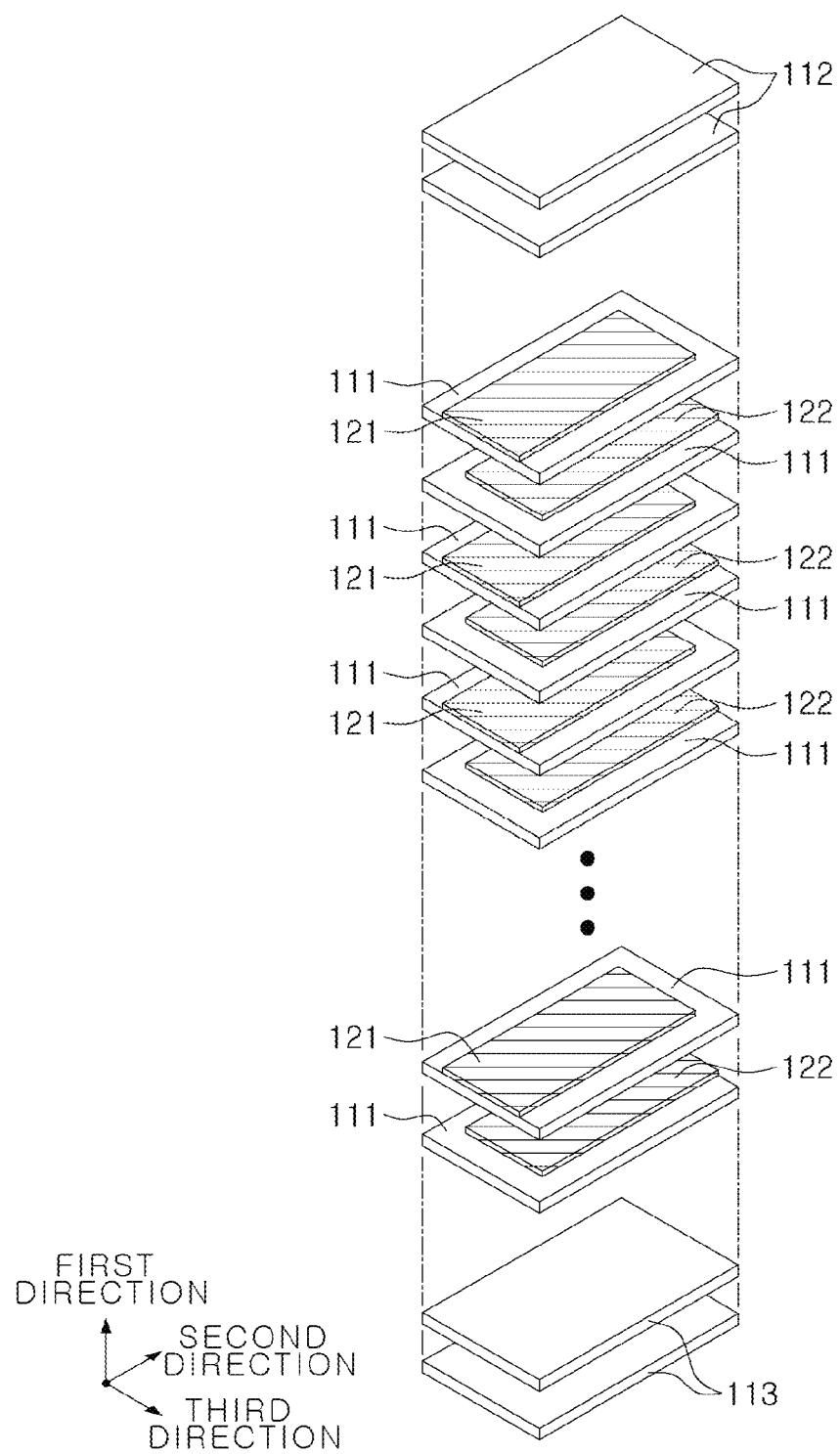
FIG. 2 is a schematic exploded perspective view illustrating a laminated structure of internal electrodes of FIG. 1.

FIG. 2 is a schematic exploded perspective view illustrating a laminated structure of internal electrodes of FIG. 1.

Figure 3:
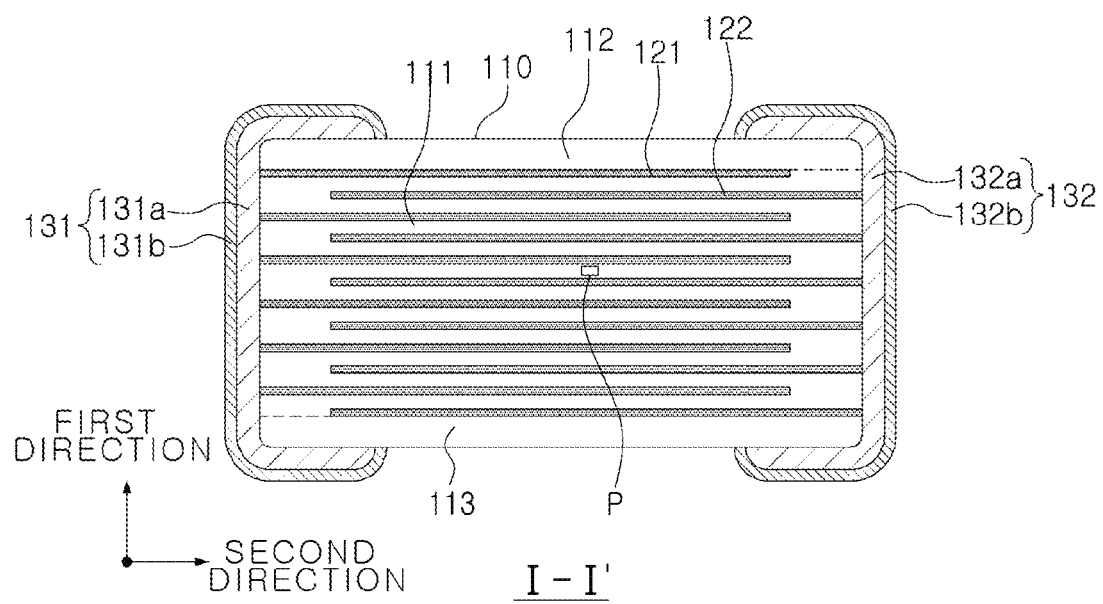
FIG. 3 is a cross-sectional view taken along line I-I' of FIG. 1.

FIG. 3 is a cross-sectional view taken along line I-I' of FIG. 1.

Figure 4:
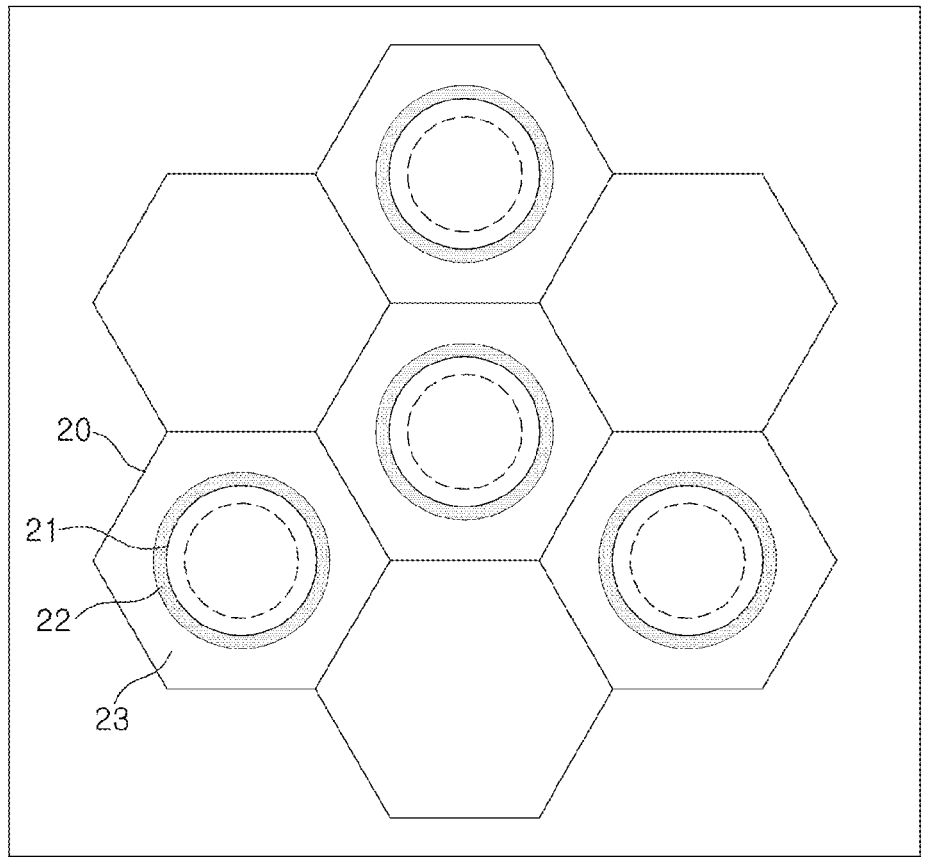
FIG. 4 is a schematic view illustrating a plurality of dielectric grains included in a P region, a portion of a dielectric layer of FIG. 3.

FIG. 4 is a schematic view illustrating a plurality of dielectric grains included in a P region, a portion of a dielectric layer of FIG. 3.

FIG. 5 is a schematic view of a dielectric grain.

Hereinafter, a multilayer electronic component according to an exemplary embodiment in the present disclosure will be described with reference to FIGS. 1 to 5.

A multilayer electronic component 100 according to an exemplary embodiment may include a body 110, including a plurality of dielectric layers 111 and internal electrodes 121 and 122, and external electrodes 131 and 132 disposed on end surfaces of the body 110 and connected to the internal electrodes 121 and 122. The dielectric layer 111 may include a plurality of dielectric grains 20. At least one of the plurality of dielectric grains 20 may have a core (21)—interface shell (22)—shell (23) structure including an inner core region 21, an interface shell region 22 including first and second interface shell regions 22a and 22b covering at least a portion of the core region 21, and a shell region 23 covering at least a portion of the interface shell region 22. The dielectric grain having the core (21)—interface shell (22)—shell (23) structure may include a perovskite ($ABO_3$)-based base main component, a first subcomponent including silicon (Si), and a second subcomponent including at least one selected from the group consisting of manganese (Mn), vanadium (V), chromium (Cr), iron (Fe), nickel (Ni), cobalt (Co), copper (Cu), zinc (Zn), and tin (Sn). An average content of the first subcomponent may be highest in the first interface shell region 22a, and an average content of the second subcomponent may be highest in the second interface shell region 22b.

In the body 110, the dielectric layers 111 and the internal electrodes 121 and 122 may be alternately laminated.

A shape of the body 110 is not particularly limited, and may be a hexahedral shape or a shape similar to the hexahedral shape, as illustrated in the drawings. While the body 110 may not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The plurality of dielectric layers 111 constituting the body 110 may be in a sintered state, and adjacent dielectric layers 111 may be integrated with each other such that boundaries therebetween not readily apparent without using a scanning electron microscope (SEM).

A material of the dielectric layer 111 may not be limited to any particular material as long as sufficient capacitance is able to be obtained therewith. For example, as the material, a barium titanate material, a perovskite material compound with lead (Pb), a strontium titanate material, or the like, may be used. The barium titanate material may include $BaTiO_3$-based ceramic powder particles, and an example of the ceramic powder particles may include $BaTiO_3$, $(Ba_{1-x}Ca_x)TiO_3$ (0<x<1), $Ba(Ti_{1-y}Ca_y)O_3$(0<y<1), $(Ba_{1-x}Ca_x)(Ti_{1-y}Zr_y)O_3$(0<x<1, 0<y<1), $Ba(Ti_{1-y}Zr_y)O_3$(0<y<1), or the like, in which calcium (Ca), zirconium (Zr), and the like, are partially solid-solute in $BaTiO_3$, or the like.

As the material of the dielectric layer 111, various ceramic additives, organic solvents, plasticizers, coupling agents, dispersants, and the like, may be added to powder particles such as barium titanate ($BaTiO_3$) powder particles, or the like, depending on an intended purpose.

In a process of forming a barium titanate ($BaTiO_3$)-based dielectric particle having a size of about 60 nm according to the related art, $Ba(OH)_2$ may be prepared and $TiO_2$ may then be introduced into $Ba(OH)_2$ to form a $BaTiO_3$ seed having a size of about 10 nm. An additive such as a metal oxide may be added to the $BaTiO_3$ seed, and grain growth may then be performed in a high-temperature and high-pressure environment to produce dielectric particles having a size of about 60 nm. In the dielectric particles produced by the manufacturing method according to the related art, a core diameter of a tetragonal structure may have a size of about 30 nm, and a diameter of a cubic structure in a region doped with metallic ions may have a size of about 30 nm.

For example, in the manufacturing method according to the related art, it may be difficult to suppress diffusion of an additive into the core. Therefore, it may be difficult to control dielectric characteristics. For example, in the case of BaTiO$_3$ dielectric particles having a size of about 60 nm, a core having a tetragonal structure remains in the stage of about 30 nm.

However, as in an exemplary embodiment, when silicon (Si) which may increase grain boundary resistance is coated and an acceptor element suppressing formation of oxygen vacancy is doped during formation of dielectric particles, dielectric characteristics may be improved while preventing deterioration of an internal electrode.

In addition, when an additive such as a rare earth element is further added to the dielectric particles to be subjected to a sintering heat treatment, dielectric grains for improving reliability and simultaneously increasing dielectric characteristics may be included in the dielectric layer.

With only the method of preparing dielectric grains according to the related art, it may be difficult to form the first interface shell 22a and the second interface shell 22b to be described later, and it may also be difficult to implement effects thereof, which will be described in more detail below.

Referring to FIG. 4, the dielectric layer 111 may include a plurality of dielectric grains 20. In FIG. 4, region "P" schematically illustrates a plurality of dielectric grains 20 by magnifying an arbitrary dielectric layer 111.

In this case, at least one of a plurality of dielectric grains 20 and 20' may have a core (21)—interface shell (22)—shell (23) structure including an inner core region 21, an interface shell region including first and second interface shell regions 22a and 22b covering at least a portion of the core region 21, and a shell region 23 covering at least a portion of the interface shell region 22. However, it is not necessary for the interface shells to be separated into first and second interface shells.

In more detail, referring to FIG. 5, the core region 21 of the dielectric grains 20 and 20' may have a first core (21a)—second core (21b) structure including a first core region 21a, disposed on an internal side thereof, and a second core region 21b covering at least a portion of the first core region 21a. The first core region 21a may have a tetragonal structure, and the second core region 21b may include a second subcomponent and may have a cubic structure. In this case, the second subcomponent may be included in the second core region 21b, so that the perovskite (ABO$_3$)-based structure of the second core region 21b may become a cubic structure. The tetragonal structure and the cubic structure may be determined by X-ray diffraction (XRD), X-ray crystallography, or TEM imaging and analysis. Other methods and/or tools appreciated by one of ordinary skill in the art, even if not described in the present disclosure, may also be used.

BaTiO$_3$, (Ba, Ca) (Ti, Ca)O$_3$, (Ba, Ca) (Ti, Zr)O$_3$, and Ba(Ti, Zr)O$_3$, used as a base main component of a dielectric material, may correspond to a perovskite-based structure represented by ABO$_3$, and an oxygen vacancy, in which vacancies for oxygen are vacated, may be formed during a heat treatment process. For example, when sintering is performed in a reducing atmosphere, an oxygen vacancy may be formed, and an oxygen vacancy may also be formed even when carbon is combined with oxygen of ABO$_3$ to evaporate in the form of CO$_2$ by a debinder, or the like. Oxygen (O) has a charge of −2 valence. When a place in which oxygen should be present is empty, an oxygen vacancy having a charge of +2 valence may be formed. When an oxygen vacancy is moved by an applied electric field, reliability may be deteriorated. The more the oxygen vacancy and the higher a temperature and a voltage, the greater the moving speed and the moving amount are increased, thereby further deteriorating reliability. To address an issue of an oxygen vacancy, a subcomponent or an additive such as another metal oxide may be generally doped. In this case, an element having the same oxidation number as titanium (Ti) but having a different ionic radius may be partially substituted. An additive to be added may include at least one selected from the group consisting of manganese (Mn), vanadium (V), chromium (Cr), iron (Fe), nickel (Ni), cobalt (Co), copper (Cu), zinc (Zn), and tin (Sn), but exemplary embodiments are not limited thereto. At least one of the plurality of dielectric grains 20, included in the dielectric layer 111 after a sintering process, may include the additive as a subcomponent to have a cubic structure.

In general, a BaTiO$_3$-based dielectric material may have a tetragonal structure at room temperature, but a region in which some elements are substituted may be transformed into a lattice structure having a cubic structure, and converted into a phase having a dipole moment, such that a dielectric constant of the region itself may be increased to secure a high dielectric constant while having a small size without grain growth. As a result, an ultra-thin dielectric film may be formed and microminiaturization of a multilayer electronic component may be achieved.

In general, it is known that a dielectric constant is increased when a size of a region having a tetragonal structure is large compared to a size of a region having a cubic structure. For example, among dielectric particles having the same size, a dielectric particle, in which a ratio of a tetragonal structure size to a cubic structure size is higher, may have a higher dielectric constant.

In the present specification, the average diameter of the core region 21, first core region 21a, and the second core region 21b described in relation to one configuration of the dielectric grains 20 and 20' may be a value obtained by drawing a straight line passing through a center of the core 21 of a dielectric grain recognizable in a scanning electron microscope (SEM) image or a transmission electron microscope (TEM) image, measuring a difference between a minimum distance and a maximum distance as measured in a line-profile graph (e.g., FIG. 6) of each configuration disposed on the straight line, measuring such a difference between the minimum distance and the maximum distance at various angles, and averaging the measured differences. However, exemplary embodiments are not limited thereto, and the average diameter may be measured to be different depending on characteristics of each configuration of the dielectric grain 20.

In the multilayer electronic component according to an exemplary embodiment, an average diameter of the core region 21 of the dielectric grains 20 and 20' may be 55 nm or more and 65 nm or less. In this case, an average diameter of the first core region 21a of the core region 21 may be 45 nm or more and 55 nm or less, and an average diameter of the second core region 21b in the core 21 may be 5 nm or more and 15 nm or less. The average diameter of the second core region 21b may refer to an average thickness of the second core region 21b.

The average diameter of the core region 21 of the dielectric grains 20 and 20' after a sintering process may be a size of the dielectric particle before the sintering process, but exemplary embodiments are not limited thereto. However, due to the first subcomponent including silicon (Si) to be described later, the average diameter of the second core region 21b may be smaller than that in the case in which a dielectric particle is sintered according to the related art.

When the average diameter of the second core region 21b has a size of 5 nm or less, it may be difficult to effectively suppress oxygen vacancy. When the average diameter of the second core region 21b has a size greater than 15 nm, the region having the tetragonal structure may be reduced due to excessive doping of the second subcomponent to decrease a dielectric constant.

The interface shell region 22 covering at least a portion of the core region 21 may include a first interface shell 22a and a second interface shell region 22b.

Figure 5A:
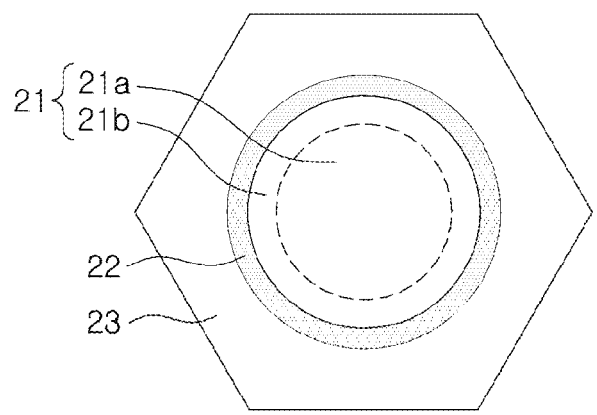
FIG. 5A and FIG. 5B are each a schematic view of a dielectric grain.
Figure 5B:
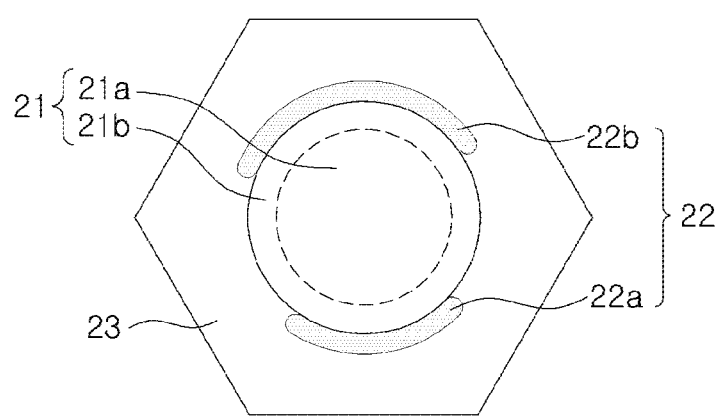

In more detail, referring to FIG. 5B, in the dielectric grain 20' having the core (21)—interface shell (22)—shell (23) structure, the first interface shell 22a and the second core interface shell 22b covering at least a portion of a surface of the core region 21 may simultaneously cover the core region 21. In FIG. 5B, the first and second interface shells 22a and 22b are illustrated as having shapes which do not overlap each other, but exemplary embodiments are not limited thereto. The first and second interface shells 22a and 22b may have shapes overlapping each other. Among the first and second interface shells 22a and 22b formed, an interface shell having a large region may have a shape including an interface shell having a small region.

A content of a subcomponent, included in a high amount in the first interface shell 22a, may be different from a content of a subcomponent, included in a high amount in the second interface shell 22a. For example, the subcomponent included in the first interface shell region 22a may refer to a first subcomponent including silicon (Si), and the subcomponent included in the second interface shell region 22b may refer to a second subcomponent including at least one selected from the group consisting of Mn, V, Cr, Fe, Ni, Co, Cu, Zn, and Sn.

For example, the dielectric grains 20 and 20' having the core (21)—interface shell (22)—shell (23) structure may include a barium titanate ($BaTiO_3$)-based base material as a main component, and may include the first subcomponent including Si and the second subcomponent. An average content of the first subcomponent may be highest in the first interface shell region 22a, and an average content of the second subcomponent may be highest in the second interface shell region 22b. It means, the average content of the first subcomponent and the second subcomponent are respectively highest in the interface shell region 22. Here, the average content of tin (Sn) is highest in the second subcomponent.

More specifically, the average content of the first subcomponent may be highest in the first interface shell region 22a, as compared to an average content of the second component and an average content of a rare earth element in a dielectric grain. The average content of the first subcomponent may be obtained by performing TEM-EDS analysis at ten equally spaced points in the first interface shell region 22a and averaging the results from the ten points. The average content of the first subcomponent may be obtained from a line-profile graph, for example, see FIG. 6. Other methods and/or tools appreciated by one of ordinary skill in the art, even if not described in the present disclosure, may also be used. An average content of the second subcomponent may be highest in the second interface shell region 22b as compared to an average content of the first component and an average content of the rare earth element in the same dielectric grain. The average content of the second subcomponent may be obtained by performing TEM-EDS analysis at ten equally spaced points in the second interface shell region 22b and averaging the results from the ten points. The average content of the second subcomponent may be obtained from a line-profile graph, for example, see FIG. 6. Other methods and/or tools appreciated by one of ordinary skill in the art, even if not described in the present disclosure, may also be used.

In some embodiments, in the first interface shell region, an average content of the first subcomponent may be higher than an average content of the second subcomponent. In some embodiments, in the second interface shell region, the average content of the second subcomponent may be higher than the average content of the first subcomponent.

Since silicon (Si) is included in the first interface shell region 22a in the state of a dielectric particle before a sintering process, diffusion of the second subcomponent of the second interface shell region 22b into the core may be suppressed to form a relatively small second core region 21b having an average diameter. Therefore, reliability may be improved due to an oxygen vacancy suppression effect caused by the second subcomponent, and at the same time, the size of the first core region 21a, having a tetragonal structure, of the core 21 is reduced to a cubic structure may be maintained to be larger than the size of the second core region 22b, having a cubic structure, of the first core region 21a, and thus, a multilayer electronic component having a high dielectric constant may be implemented.

In addition, when the content of Si included in the first interface region shell 22a is high, for example, the first interface shell region 22a including Si is formed, so that formation of a liquid phase by Si may allow a sintering temperature to be decreased by 5° C. to about 10° C. to implement the same dielectric capacity and dielectric loss fact (DF) as compared with the conventional case in which the first interface shell region 22a is absent. In addition, as the sintering temperature is decreased, deterioration may be prevented in the internal electrodes 121 and 122 of the ultra-thin film.

The following description will be made with reference to FIGS. 5A and 5B. The interface shell region 22, covering at least a portion of the core region 21, may include a first interface shell region 22a and a second interface shell region 22b, and each of the first interface shell 22a and the second interface shells 22b may cover the surface of the core region 21. However, the first interface shell 22a and the second interface shells 22b may, in detail, simultaneously cover the surface of the core region 21.

In this case, the average diameter of the first interface shell region 22a may be 2 nm or more and 5 nm or less. The average diameter of the first interface shell region 22a may refer to an average thickness of the first interface shell region 22a.

A diameter of the first interface shell region 22a may refer to a distance between a point of the first interface shell region 22a near to an external side of the core region 21 and a point of the first interface shell region 22a distant from the core region 21, disposed on a straight line from a center of a core of the dielectric grain 20'. The first interface shell 22a may cover the surface of the core 21. When the first interface shell 22a has a predetermined area, diameters of the first interface shell region 22a at various angles in, for example, a TEM image, may be measured and averaged to obtain an average value. The average value may refer to an average diameter of the first interface shell region 22a. Such a measurement method may also be applied to a diameter and an average diameter of the second interface shell region 22b to be described later.

As another method, the average diameter of the first interface shell region 22a and the second interface shell region 22b may be obtained using a Gaussian fitting method. The Gaussian fitting method may correspond to a formula, capable of obtaining full width at half maximum (FWHM) using a Gaussian function. Data may be obtained from TEM using line profile raw data for each of the first and second interface shell regions 22a and 22b, a Gaussian fitting equation corresponding to the following Equation 1 may be applied to remove noise, a size obtained by measuring a range of a peak value of a derived graph may extend to 10 pieces of raw profile raw data to obtain an average value. The average diameter of the first interface shell region 22a and the second interface shell region 22b may be the obtained average value. As the number of samples increases, it is preferable to derive the average value.

As can be seen from a TEM-EDS image, the interface shell 22 may have a predetermined diameter, and a more detailed average diameter (thickness) may be specifically measured through Gaussian fitting.

$$y = y0 + \frac{A\exp\left(\frac{-4\ln 2(x-xc)^2}{w^2}\right)}{w\sqrt{\frac{\pi}{4\ln 2}}}$$ Equation (1)

($y0$ = base, $xc$ = $x$ value at center, $A$ = area, $w$ = FWHM)

When the average diameter of the first interface shell region 22a is less than 2 nm, it may be difficult to implement a sufficient grain boundary resistance effect. When the average diameter of the first interface shell region 22a is greater than 5 nm, the grain boundary resistance effect may be increased, but a dielectric constant may be decreased.

The first interface shell region 22a may cover 20% or more and 50% or less of the surface of the core region 21. When the surface of the core region 21 covered with the first interface shell region 22a is less than 20%, it may be difficult to implement a sufficient grain boundary resistance effect. When the surface of the core region covered with the first interface shell region 22a is greater than 50%, the grain boundary resistance effect may be increased, but the dielectric constant may be decreased.

The average diameter of the second interface shell region 22b may have a size of 3 nm or more to 10 nm or less. The average diameter of the second interface shell region 22b may refer to an average thickness of the second interface shell region 22b.

When the average diameter of the second interface shell region 22b is less than 3 nm, it may be difficult to implement a sufficient oxygen vacancy suppression effect. When the average diameter of the second interface shell region 22b is greater than 10 nm, oxygen vacancy suppression effect may be increased, but the dielectric constant may be decreased.

The second interface shell region 22b may cover 35% or more to 80% or less of the surface of the core region 21. When the surface of the core region 21 covered with the second interface shell region 22b is less than 35%, it may be difficult to implement a sufficient oxygen vacancy suppression effect. When the surface of the core region 21 covered with the second interface shell region 22b is greater than 80%, the oxygen vacancy suppression effect may be increased, but the dielectric constant may be decreased. For example, the extent of coverage may be determined by processing a TEM image using an image processing software. Other methods and/or tools appreciated by one of ordinary skill in the art, even if not described in the present disclosure, may also be used.

According to an exemplary embodiment, a ratio of covering the surface of the core region 21 tends to be increased as the average diameter of the first and second interface shell regions 22a and 22b is increased. However, exemplary embodiments are not limited thereto, and even when the average diameter is small, a region covering the core 21 may be large. In contrast, even when the average diameter is large, the region covering the core 21 may be small.

The shell region 23 of the dielectric grains may cover at least a portion of the interface shell region 22, and may refer to a region from an external side of the interface shell 22 to a grain boundary.

The dielectric grain 20 may include a rare earth element including at least one selected from the group consisting of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). For example, an average content of the rare earth element may be highest in the shell region 23 of the dielectric grains 20 and 20' having the core (21)—interface shell (22)—shell (23) structure. This may be considered to be the fact that diffusion into the core 21 is suppressed by the first interface shell 22a. Accordingly, reliability depending on the rare earth element may be improved and dielectric characteristics may be further improved. The average content of the rare earth element may be highest in the shell region 23 as compared to an average content of the first component and an average content of the second component in a dielectric grain. The average content of the rare earth element may be obtained by performing TEM-EDS analysis at ten equally spaced points in the shell region 23 and averaging the results from the ten points. The average content of the rare earth element may be obtained from a line-profile graph, for example, see FIG. 6. Other methods and/or tools appreciated by one of ordinary skill in the art, even if not described in the present disclosure, may also be used.

In some embodiments, an average content of the rare earth element in the shell region may be higher than the average content of the rare earth element in the interface region. In some embodiments, in the shell region, an average content of the rare earth element may be higher than an average content of the first subcomponent and an average content of the second subcomponent.

The rare earth element may effectively substitute a site of the barium titanate ($BaTiO_3$)-based element and may be effective in reducing an oxygen vacancy defect concentration. In addition, the rare earth element may suppress excessive grain growth to prevent degradation of reliability.

The boundaries for the first and second cores 21a and 21b, first and second interface shell regions 22a and 22b, and shell region 23 may be determined by TEM-EDS or by a line-profile graph. Other methods and/or tools appreciated by one of ordinary skill in the art, even if not described in the present disclosure, may also be used.

Figure 6:
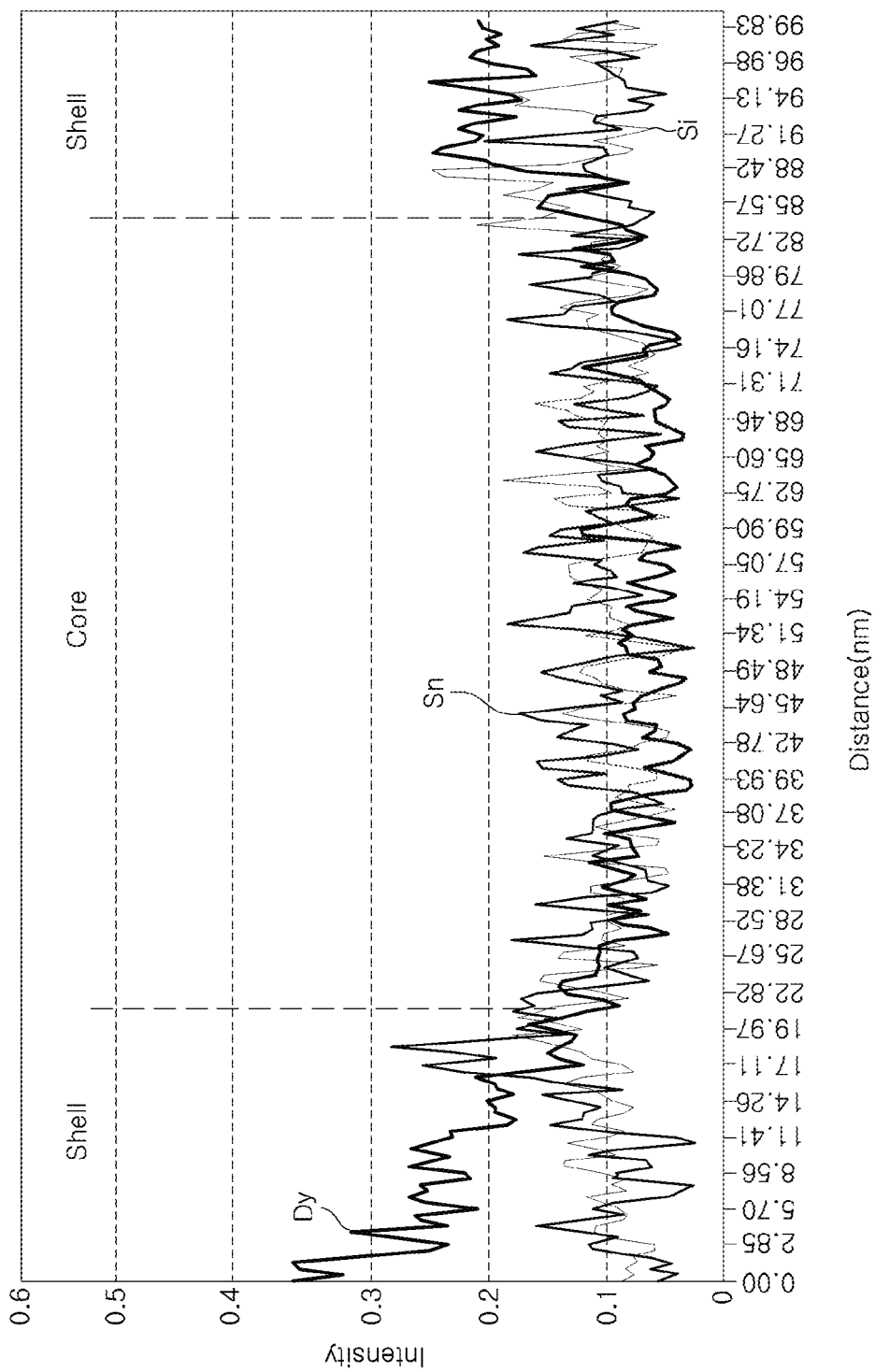
FIG. 6 is a view illustrating a line-profile graph obtained by measuring elements of a dielectric grain according to an exemplary embodiment in the present disclosure.

FIG. 6 is a view illustrating a line-profile graph obtained by contents of silicon (Si), a first subcomponent, tin (Sn), a second subcomponent, and dysprosium (Dy), a rare earth element, from one grain boundary to another grain boundary of dielectric grains included in the dielectric layer 111 of the multilayer electronic component according to an exemplary embodiment.

By checking a content of tin (Sn) element, it may be seen that a peak is formed in a region from about 17.11 nm to about 19.97 nm. From this, it may be seen that the second interface shell region 22b is formed on one side of the core region 21. By checking a content of silicon (Si) element, it may be seen that a peak is formed in a region from about 84.00 nm to about 88.42 nm. From this, it may be seen that the first interface shell region 22a is formed on the other side of the core region 21.

FIGS. 7 and 8 are views illustrating TEM-EDS images according to an exemplary embodiment in the present disclosure and a comparative example.

Figure 7A:
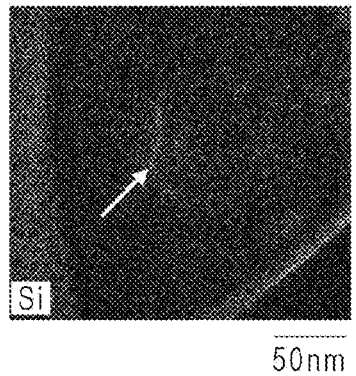
FIGS. 7A to 7C are views illustrating TEM-EDS analysis images according to an exemplary embodiment in the present disclosure and a comparative example.
Figure 7B:
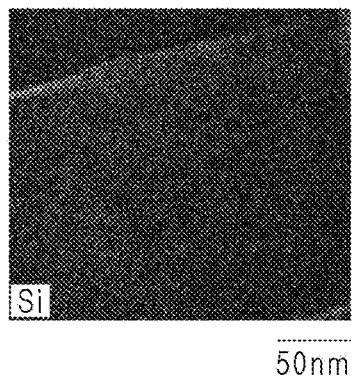
Figure 7C:
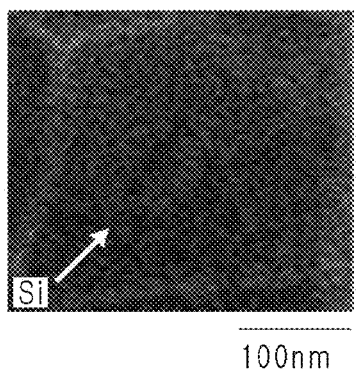

For example, FIG. 7A is a view illustrating a TEM-EDS image in the case in which a first interface shell region 22a, including silicon (Si) as a dielectric grain of an exemplary embodiment, covers the surface of the core region 21 by 20% or more to 50% or less. As can be indicated by arrows, there is a first interface shell region 22a having a predetermined thickness. For example, the extent of coverage may be determined using an image processing software. Other methods and/or tools appreciated by one of ordinary skill in the art, even if not described in the present disclosure, may also be used. FIG. 7B is a view illustrating a TEM-EDS image in the case in which a dielectric particle, prepared by a method according to the related art as a dielectric grain of the comparative example, is sintered. As can be seen from FIG. 7B, silicon (Si) is added as an additive after the dielectric particle is prepared using the method according to the related art, but the first interface shell region 22a is not formed. FIG. 7C is a view illustrating a TEM-EDS image in the case in which the first interface shell region 22a covers the surface of the core region 21 by less than 20%, as a dielectric constant of the comparative example. It can be seen that the first interface shell region 22a is faintly present in a region indicated by an arrow but is not so clear as in FIG. 7A. From this, it may be expected that a grain boundary resistance effect will be insufficiently exhibited.

Figure 8A:
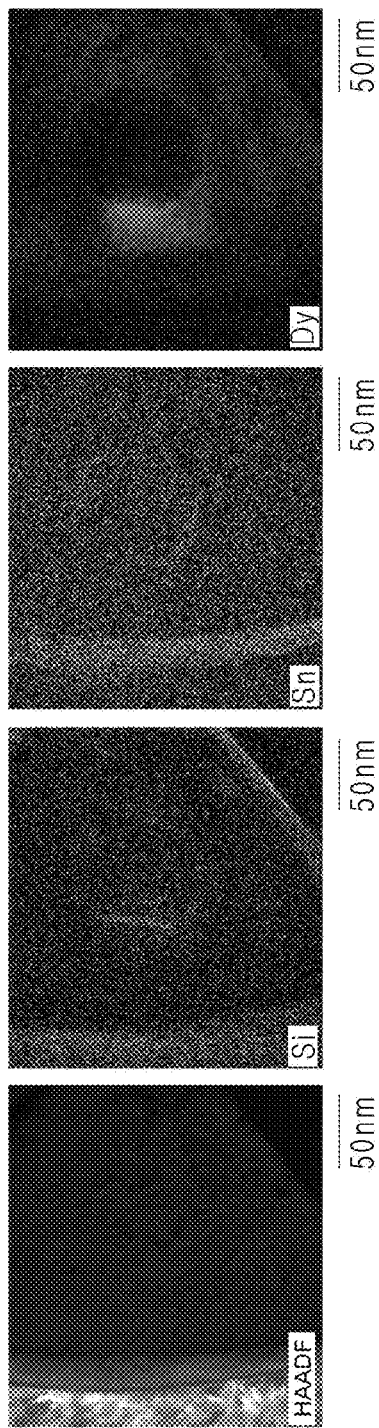
FIGS. 8A and 8B are views illustrating TEM-EDS analysis images according to an exemplary embodiment in the present disclosure and a comparative example.
Figure 8B:
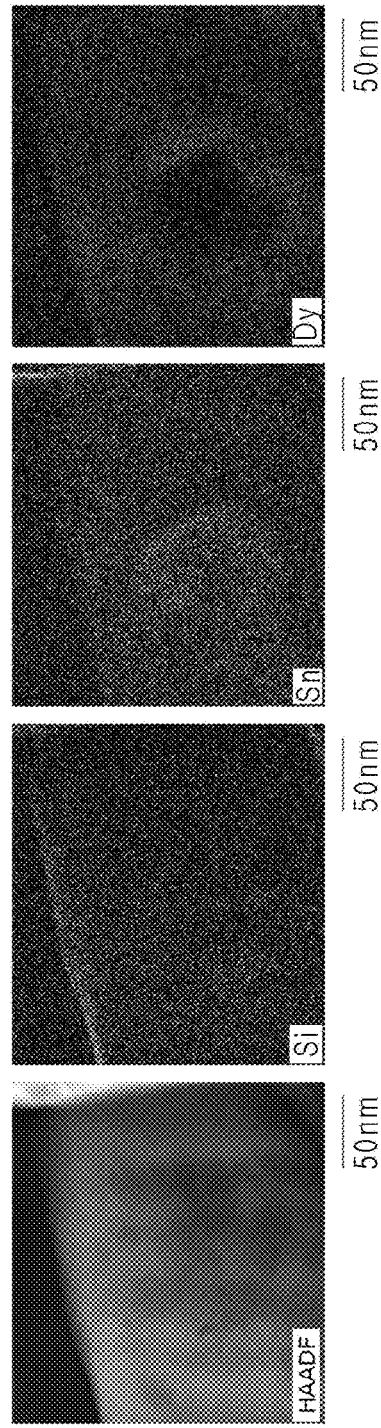

FIG. 8A is a view illustrating a TEM-EDS image of Si, Sn, and Dy elements of a dielectric grain according to an exemplary embodiment, and a Si image is the same as that of FIG. 7A. It may be seen that the second interface shell region 22b including Sn covers the surface of the core region 21, is formed in a region similar to that of the first interface shell region 22a, and is formed to have a predetermined thickness. It may also be seen that Dy, a rare earth element, is mainly included in the shell region 23 without diffusing into the core 21. FIG. 8B is a dielectric grain of a comparative example, and a Si image is the same as that of FIG. 7B. Although Sn is formed to surround the core region 21 but is not formed to have a predetermined thickness, it may be difficult to clearly distinguish the second interface shell region 22b. From this, it may be expected that diffusion into the core 21 occurs, and thus, a region having a cubic structure will be relatively large and will include Dy, a rare earth element.

A thickness td of the dielectric layer 111 does not need to be limited. However, to more easily achieve miniaturization and high capacitance of the multilayer electronic component, a thickness of the internal electrodes 121 and 122 may be 0.6 μm or less and, in more detail, 0.4 μm or less. The thickness td of the dielectric layer 111 may refer to an average thickness td of the dielectric layer 111.

The average thickness td of the dielectric layer 111 may refer to an average thickness of the dielectric layer 111 disposed between the first and second internal electrodes 121 and 122.

The average thickness td of the dielectric layer 111 may be measured by scanning the cross-sections in the first and second directions (length and thickness directions, an plane) of the body 110 with a scanning electron microscope (SEM) with a magnification of 10,000. For example, an average value thereof may be determined by measuring a thickness of a single dielectric layer at thirty (30) equally spaced points in the length direction in the scanned image. The thirty (30) equally spaced points may be designated in the active portion Ac. In addition, when such an average value is determined using measurements of average values to ten (10) dielectric layers, the average thickness td of the dielectric layer 111 may be more generalized. In this case, the average thickness td of the dielectric layer 111 may refer to an average distance in the first direction.

The body 110 may include an active portion Ac disposed in the body 110 and including the first internal electrode 121 and the second internal electrode 122, disposed to oppose each other, with the dielectric layer 111 interposed therebetween to form capacitance, and upper and lower cover portions 112 and 113 formed on opposite end surfaces of the active portion Ac in the first direction, and margin portions 114 and 115 may be disposed on both side surfaces of the active portion Ac in the third direction.

The active portion Ac may be a portion contributing to capacitance formation of the multilayer electronic component, and may be formed by repeatedly laminating the plurality of first and second internal electrodes 121 and 122 with the dielectric layer 111 interposed therebetween.

The cover portions 112 and 113 may include an upper cover portion 112 disposed above the active portion Ac in the first direction, and a lower cover portion 113 disposed below the active portion Ac in the first direction.

The upper cover portion 112 and the lower cover portion 113 may be formed by stacking a single dielectric layer or two or more dielectric layers on upper and lower surfaces of the active portion Ac, respectively, in the first direction (the thickness direction), and may basically play a role in preventing damage to the internal electrodes due to physical or chemical stress.

The upper cover portion 112 and the lower cover portion 113 may not include internal electrodes, and may include the same material as the dielectric layer 111. For example, the upper cover portion 112 and the lower cover portion 113 may include a ceramic material, and may include, for example, a barium titanate ($BaTiO_3$)-based ceramic material.

Average thicknesses tc of the cover portions 112 and 113 are not limited. To more easily achieve miniaturization and high capacitance of the multilayer electronic component, an average thickness tc of each of the cover portions 112 and 113 may be 30 μm or less. In the case of ultra-small products, the average thickness tc of each of the cover portions 112 and 113 may be, in more detail, 20 μm or less.

Average thicknesses tc of the cover portions 112 and 113 may be measured by scanning the cross-sections in the first and second directions (length and thickness directions, an L-T plane) of the body 110 with a scanning electron microscope (SEM) with a magnification of 10,000. For example, an average value thereof may be determined by measuring a thickness of a single cover portion 112 or 113 at thirty (30) equally spaced points in the length direction in the scanned image. The thirty equally spaced points may be designated in the upper and lower cover portions 112 and 113. In addition, when the average value is measured by extending the measurement of the average value to the upper and lower cover portions 112 and 113, the average thicknesses tc of the upper and lower cover portions 112 and 113 may be more generalized. In this case, the average thicknesses tc of the cover portions 112 and 113 may refer to average sizes of the cover portions 112 and 113 in the first direction.

The margin portions may include a first margin portion, disposed on the fifth surface 5 of the body 110, and a second margin portion disposed on the sixth surface 6 of the body 110. For example, the margin portions may be disposed on opposite side surfaces of the body 110 in the third direction (the width direction).

The margin portions may refer to regions between both side surfaces of the first and second internal electrodes 121 and 122, and an external surface of the body 110, in a cross-section of the body 110 cut in the first and third directions (the thickness and width directions, W-T direction) and a boundary surface of the body 110.

The margin portions may refer to a region between opposite side surfaces of the first and second internal electrodes 121 and 122 in the third direction and a boundary surface of the body 110, based on a cross-section of the body 110 in thickness and width (W-T) directions.

The margin portions may basically play a role in preventing damage to the internal electrodes caused by physical or chemical stress.

The margin portions may be prepared by forming the internal electrodes 121 and 122 on a ceramic green sheet by applying a conductive paste to a ceramic green sheet, except for a portion in which the margin portions are formed. As described above, to suppress a step difference caused by the internal electrodes 121 and 122, after performing a lamination operation, the internal electrodes 121 and 122 may be cut to be exposed to the fifth and sixth surfaces 5 and 6 of the body 110, and the margin portions may be formed by laminating a single dielectric layer or two or more dielectric layers on opposite side surfaces of the active portion Ac in the third direction (the width direction).

The margin portions may be formed by forming the internal electrodes 121 and 122 by applying a conductive paste on the ceramic green sheet, except for a portion in which the margin portions are to be formed. As described above, in order to suppress the step difference caused by the internal electrodes 121 and 122, the internal electrodes 121 and 122 may be cut to be exposed to the fifth and sixth surfaces 5 and 6 of the body 110 after lamination. Then, the margin portions may be formed by laminating a single dielectric layer 111 or two or more dielectric layers 111 on opposite side surfaces of the active portion Ac in the third direction (width direction).

Average widths of the first and second margin portions do not need to be limited. To more easily achieve miniaturization and high capacitance of the multilayer electronic component 100, an average width of each of the first and second margin portions may be 30 µm or less. In the case of ultra-small products, the average width of each of the first and second margin portions may be, in more detail, 20 µm or less.

Average thicknesses of the margin portions may be measured by scanning the cross-sections in the first and second directions (width and thickness directions, a W-T plane) of the body 110 with a scanning electron microscope (SEM) with a magnification of 10,000. For example, an average value thereof may be determined by measuring a thickness of a single margin portion at ten (10) equally spaced points in the length direction in the scanned image. The ten (10) equally spaced points may be designated in the first margin portion. In addition, when the average value is measured by extending the measurement of the average value to the first and second margin portions, the average width of the margin portions may be more generalized. In this case, the average width of the margin portions may refer to average sizes of the margin portions in the third direction.

The internal electrodes 121 and 122 may be laminated alternately with the dielectric layer 111. The internal electrodes 121 and 122 may include the first internal electrode 121 and the second internal electrode 122, and the first and second internal electrodes 121 and 122 may be alternately disposed to oppose each other with the dielectric layers 111, interposed therebetween, and may be exposed from the third and fourth surfaces 3 and 4 of the body 110, respectively.

The first internal electrode 121 may be spaced apart from the fourth surface 4 and may be exposed from the third surface 3, and the second internal electrode 122 may be spaced apart from the third surface 3 and may be exposed from the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 may not be connected to the second external electrode 132 but may be connected to the first external electrode 131, and the second internal electrode 122 may not be connected to the first external electrode 131 but may be connected to the second external electrode 132. In this case, the first and second internal electrodes 121 and 122 may be electrically separated from each other by the dielectric layer 111 interposed therebetween.

The body 110 may be formed by alternately laminating a ceramic green sheet, on which the first internal electrode 121 is printed, and a ceramic green sheet, on which the second internal electrode 122 is printed, and then sintering the laminated ceramic green sheets.

A material for forming the internal electrodes 121 and 122 not limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but exemplary embodiments are not limited thereto.

Average thicknesses the of the internal electrodes 121 and 122 does not need to be limited.

In general, when the internal electrodes 121 and 122 are formed as a thin film having an average thickness of 0.6 µm or less, in particular, when the average thickness of each of the internal electrodes 121 and 122 is 0.4 µm or less, reliability may be deteriorated. However, according to an exemplary embodiment, the first interface shell 22a may be included in the dielectric grain 20 to perform a sintering process at a relatively low temperature and to prevent deterioration of the internal electrodes 121 and 122. Therefore, excellent reliability may be secured even when the average thickness the of each of the internal electrodes 121 and 122 is 0.4 µm or less.

The average thickness the of each of the internal electrodes 121 and 122 may be measured by scanning the cross-sections in the first and second directions (length and thickness directions, an L-T plane) of the body 110 with a scanning electron microscope (SEM) with a magnification of 10,000. For example, an average value thereof may be determined by measuring a thickness of one (1) internal electrode at thirty (30) equally spaced points in the second direction (the length direction) in the scanned image. The thirty (30) equally spaced points may be designated in the active portion Ac. In addition, when such an average value is determined using measurements of average values to ten (10) internal electrodes, the average thickness the of the internal electrode may be more generalized. In this case, the average thickness the of the internal electrode may refer to an average size of the internal electrodes 121 and 122 in the first direction.

In the exemplary embodiment, a structure in which the ceramic electronic component 100 has two external electrodes 131 and 132 has been described. However, the number and shape of the external electrodes 131 and 132 may vary depending on the shape of the internal electrodes 121 and 122 or other purposes.

The external electrodes 131 and 132 may be disposed on the third and fourth surfaces 3 and 4 of the body 110. For example, the external electrodes 131 and 132 may be respectively disposed on the third and fourth surfaces 3 and 4 of the body 110, and may include first and second electrode layers 131a and 132a, respectively connected to the first and second internal electrodes 121 and 122.

The external electrodes 131 and 132 may be formed of any material as long as they have electrical conductivity, such as a metal, and specific materials may be determined in consideration of electrical characteristics, structural stability, or the like, and further may have a multilayer structure.

The external electrodes 131 and 132 may be sintered electrodes including a conductive metal and a glass, or resin-based electrodes including a conductive metal and a resin.

For example, the external electrodes 131 and 132 may include electrode layers 131a and 132a, disposed on the body 110, and plating layers 131b and 132b formed on the electrode layers 131a and 132a. As a more detailed example of the electrode layers 131a and 132a, the electrode layers 131a and 132a may be sintering electrodes including a conductive metal and glass, or resin-based electrodes including a conductive metal and resin. In addition, the electrode layers 131a and 132a may be in a form in which a sintering electrode and a resin-based electrode are sequentially formed on the body 110. In addition, the electrode layers 131a and 132a may be formed by transferring a sheet including a conductive metal onto the body 110 or by transferring a sheet including a conductive metal onto a sintering electrode. As the conductive metal included in the electrode layers 131a and 132a, a material having excellent electrical conductivity may be used, but is not limited thereto. For example, the conductive metal may be at least one of nickel (Ni), copper (Cu), and alloys thereof.

The plating layers 131b and 132b may serve to improve mounting characteristics, and may be disposed on the electrode layers 131a and 132a including a conductive metal or a sintering electrode.

The type of the plating layers 131b and 132b is not limited, and the plating layers 131b and 132b may be plating layers including at least one of nickel (Ni), tin (Sn), palladium (Pd), and alloys thereof and may include a plurality of layers.

As a more detailed example of the plating layers 131b and 132b, the plating layers 131b and 132b may be Ni-plating layers or Sn-plating layers, may include the Ni-plating layer and the Sn-plating layer sequentially formed on the plating layers 131a and 132a, or may include the Sn-plating layer, the Ni-plating layer, and the Sn-plating layer sequentially formed on the plating layers 131a and 132a. In addition, the plating layers 131b and 132b may include a plurality of Ni plating layers and/or a plurality of Sn plating layers.

A size of the multilayer electronic component 100 does not need to be limited.

To simultaneously achieve miniaturization and high capacitance, in detail, the number of laminated layers may be increased by reducing the thicknesses of the dielectric layer 111 and the internal electrodes 121 and 122. The present disclosure has an effect of preventing deterioration of internal electrodes under an electric field due to thinning of the dielectric layer 111 and the internal electrodes 121 and 122. An effect of improving reliability and capacitance per volume e according to the present disclosure may be more prominent in the multilayer electronic component 100 having a size of 0402 (length×width, 0.4 mm×0.2 mm) or less.

Hereinafter, evaluation of characteristics of an exemplary embodiment in the present disclosure and a comparative example will be described in detail.

FIGS. 9 and 10 are views illustrating graphs of highly accelerated life test (HALT) of a comparative example and an exemplary embodiment in the present disclosure.

Figure 9A:
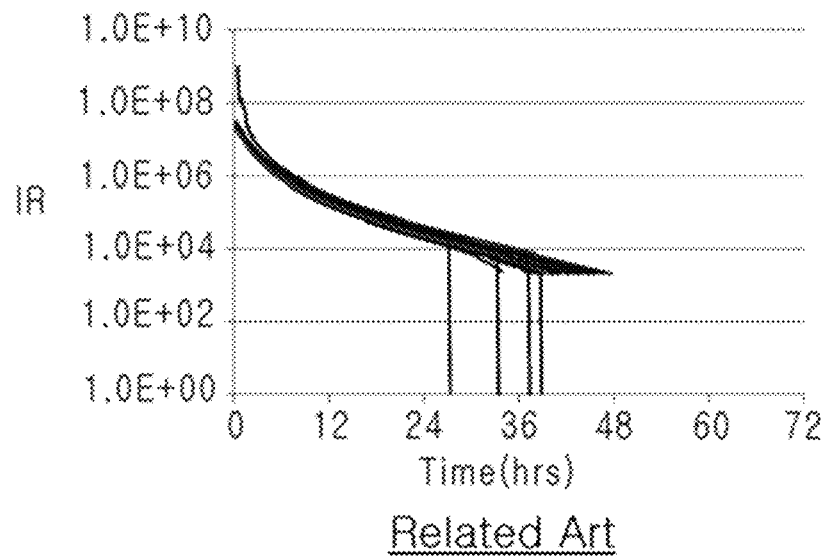
FIG. 9A and FIG. 9B illustrate a reliability evaluation (HALT) graph of a comparative example.
Figure 9B:
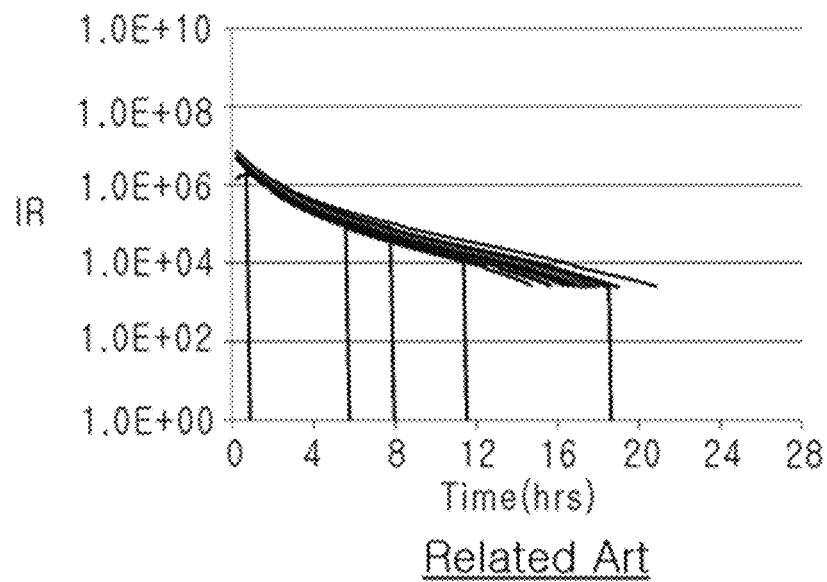

In more detail, FIG. 9 is a HALT graph of a comparative example. Referring to FIG. 9A, the HALT was performed under a temperature condition of 115° C. and a voltage condition of 1.2 Vr for 72 hours, and mean time to failure (MTTF) was 39.6 hours. Referring to FIG. 9B, the HALT was performed under a temperature condition of 115° C. and a voltage condition of 1.5 Vr for 72 hours, and MTTF was 16.2 hours. An initial IR value of the same comparative example was measured to be $5.66 \times 10^6$, and a slope value (log (initial IR/late IR)), indicating the degree of IR degradation was measured to be 3.16.

Figure 10A:
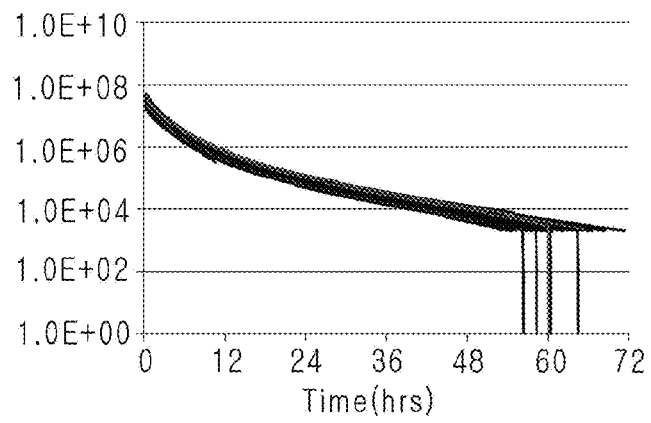
FIGS. 10A and 10B illustrate a reliability evaluation (HALT) graph of a multilayer electronic component according to an exemplary embodiment in the present disclosure.
Figure 10B:
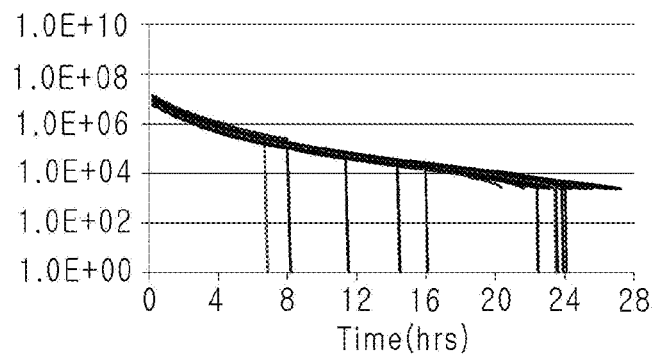

FIG. 10 is a HALT graph of an exemplary embodiment in the present disclosure, and experimental conditions are the same as those of FIG. 9. For example, referring to FIG. 10A, the HALT was performed under a temperature condition of 115° C. and a voltage condition of 1.2 Vr for 72 hours, and the MTTF was 22.5 hours. Referring to FIG. 10B, the HALT was performed under a temperature condition of 115° C. and a voltage condition of 1.5 Vr for 72 hours, and the MTTF was 22.5 hours. The initial IR value of the same example was measured to be $8.28 \times 10^6$, and a slope value (log (initial IR/late IR)), indicating the degree of IR degradation, was measured to be 2.53.

In summary, when the Comparative Examples and the exemplary embodiment were tested under the same conditions, it may be seen that the MTTF under the conditions of FIGS. 9A and 10A was improved by about 46% from 39.6 hours to 57.9 hours, and it may be seen that the MTTF under the conditions of FIGS. 9B and 10B was improved by about 39% from 16.2 hours to 22.5 hours. It may also be seen that the initial IR value was also improved from $5.66 \times 10^6$ to $8.28 \times 10^6$, and the slope value (log (initial IR/late IR) for determining the degree of IR degradation was improved from 3.16 to 2.53, and thus, the IR degradation was reduced when the test was performed under the same temperature and voltage conditions for the same time.

Table 1 illustrates data obtained by measuring a content of silicon (Si), MTTF, and a dielectric constant detected in a multilayer electronic component depending on a content of Si introduced during preparation of dielectric particles. Due to an effect of Si included in an additive, Si was detected in a larger amount than initially added Si. It may be seen that as the amount of Si was increased, grain boundary resistance was increased, so that the MTTF tended to be increased but the dielectric constant was decreased.

The content of detected Si refers to data on the content of Si detected by TEM in a first interface region of the dielectric grain.

MTTF refers to the average dielectric breakdown time in the case in which the highly accelerated life test (HALT) is performed under a temperature condition of 125° C. and a voltage condition of 1.2 Vr.

TABLE 1

| | Content of added Si (ppm) | | | |
|---|---|---|---|---|
| | 0 | 300 | 500 | 1000 |
| Content of detected Si (ppm) | 376 | 561 | 768 | 1243 |
| MTTF (hrs) | 9.53 | 10.96 | 12.04 | 16.27 |
| Dielectric Constant | 2683.43 | 2413.076 | 2231.133 | 2064.37 |

It may be seen that when dielectric particles are formed, a content of Si detected in a first interface shell of the dielectric grain after a sintering process is increased as the content of Si which may become the first interface shell increases, and it may be seen that MTTF is increased. However, it may be seen that when Si is excessively added, the dielectric constant is decreased. From this, it may be seen that the content of Si detected in the first interface shell region of the multilayer electronic component having excellent MTTF and dielectric constant is, in detail, 1500 ppm or less and, in more detail, 1243 ppm or less.

As described above, a subcomponent additive may be doped or added to a dielectric particle to improve reliability of a multilayer electronic component.

In addition, an interface shell region may be formed in a dielectric grain to facilitate diffusion of an additive during high-temperature shortening sintering and to decrease a sintering temperature, resulting in improved insulating deterioration reliability of an internal electrode.

In addition, a region having a tetragonal structure in a dielectric grain may be increased to improve dielectric characteristics.

While example embodiments have been shown and described above, it will be apparent to those skilled in the art that modifications and variations could be made without departing from the scope of the present invention as defined by the appended claims.

What is claimed is:

1. A multilayer electronic component comprising:
   a body including dielectric layers and internal electrodes; and
   external electrodes disposed on end surfaces of the body and connected to the internal electrodes,
   wherein
   at least one of the dielectric layers includes a plurality of dielectric grains,
   at least one of the plurality of dielectric grains has a core-interface shell-shell structure including an inner core region, an interface shell region including first and second interface shell regions covering at least a portion of the core region, and a shell region covering at least a portion of the interface shell region,
   the dielectric grain having the core-interface shell-shell structure includes a barium titanate ($BaTiO_3$)-based base main component, a first subcomponent including silicon (Si), and a second subcomponent including at least one selected from the group consisting of manganese (Mn), vanadium (V), chromium (Cr), iron (Fe), nickel (Ni), cobalt (Co), copper (Cu), zinc (Zn), and tin (Sn), and
   an average content of the first subcomponent is highest in the first interface shell region, and an average content of the second subcomponent is highest in the second interface shell region.

2. The multilayer electronic component of claim 1, wherein
   the first interface shell region has an average thickness of 2 nm or more and 5 nm or less.

3. The multilayer electronic component of claim 1, wherein
   the first interface shell region covers 20% or more and 50% or less of a surface of the core region.

4. The multilayer electronic component of claim 1, wherein
   the second interface shell region has an average thickness of 3 nm or more and 10 nm or less.

5. The multilayer electronic component of claim 1, wherein
   the second interface shell region covers 35% or more and 80% or less of a surface of the core region.

6. The multilayer electronic component of claim 1, wherein
   the barium titanate ($BaTiO_3$)-based base main component includes at least one selected from the group consisting of $BaTiO_3$, $(Ba,Ca)(Ti,Ca)O_3$, $(Ba,Ca)(Ti,Zr)O_3$, and $Ba(Ti,Zr)O_3$.

7. The multilayer electronic component of claim 1, wherein
   the core region has a first core-second core structure including an inner first core region and a second core region covering at least a portion of the first core, and
   the first core region has a tetragonal structure, and the second core region includes the second subcomponent and has a cubic structure.

8. The multilayer electronic component of claim 7, wherein
   the core region has an average diameter of 55 nm or more and 65 nm or less.

9. The multilayer electronic component of claim 7, wherein
   the first core region has an average diameter of 45 nm or more and 55 nm or less.

10. The multilayer electronic component of claim 7, wherein
    the second core region has an average thickness of 5 nm or more and 15 nm or less.

11. The multilayer electronic component of claim 1, wherein
    the dielectric grain having the core-interface shell-shell structure further includes a rare earth element.

12. The multilayer electronic component of claim 11, wherein
    the rare earth element includes at least one selected from the group consisting of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

13. The multilayer electronic component of claim 11, wherein
    an average content of the rare earth element is highest in the shell region of the dielectric grain having the core-interface shell-shell structure.

* * * * *